United States Patent [19]
Boyer

[11] Patent Number: 5,529,446
[45] Date of Patent: Jun. 25, 1996

[54] METHOD OF MILLING AT LEAST A LOCALIZED REGION OF A WORKPIECE

[75] Inventor: Jean-Charles Boyer, Bouzy La Foret, France

[73] Assignee: Framatome Connectors International, Courbevoie, France

[21] Appl. No.: 387,174

[22] Filed: Feb. 13, 1995

[30] Foreign Application Priority Data

Feb. 25, 1994 [FR] France .................................. 94 02174

[51] Int. Cl.$^6$ .................................................. B03C 3/04
[52] U.S. Cl. ........................................... 409/132; 409/166
[58] Field of Search ................................. 409/131, 132, 409/25, 26, 38, 39, 50, 51, 57, 56, 66, 157, 165, 166, 167, 168

[56] References Cited

U.S. PATENT DOCUMENTS

| | | | |
|---|---|---|---|
| 3,715,956 | 2/1973 | Lieser | 409/56 X |
| 4,151,783 | 5/1979 | Zimmermann | 409/165 |
| 4,164,891 | 8/1979 | Lieser | 409/165 |
| 4,538,943 | 9/1985 | Gödecke et al. | 409/157 |
| 4,883,392 | 11/1989 | Lieser | 409/165 |

FOREIGN PATENT DOCUMENTS

| | | | |
|---|---|---|---|
| 0522973A1 | 1/1993 | European Pat. Off. | |
| 1214350 | 2/1916 | U.S.S.R. | 409/132 |
| 1195011 | 6/1970 | United Kingdom | |

*Primary Examiner*—William Briggs
*Attorney, Agent, or Firm*—Perman & Green

[57] ABSTRACT

In a method of milling at least one localized region of a workpiece the workpiece is rotated about a horizontal axis of a cylindrical region having a radius $R_p$. An external contour of radius $R_F$ of a tool is brought into contact with the cylindrical region of the workpiece at a machining point. The tool rotates about a rotation axis intersecting a first transverse axis of the workpiece perpendicular to and intersecting the longitudinal axis. The rotation axis is in a plane parallel to the longitudinal axis and to a second transverse axis of the workpiece perpendicular to and intersecting the first transverse axis and to the longitudinal axis. The rotation axis is at an angle $\alpha$ to the second transverse axis such that the tangential speed of said tool parallel to said second transverse axis is equal to the tangential speed of said workpiece.

9 Claims, 4 Drawing Sheets

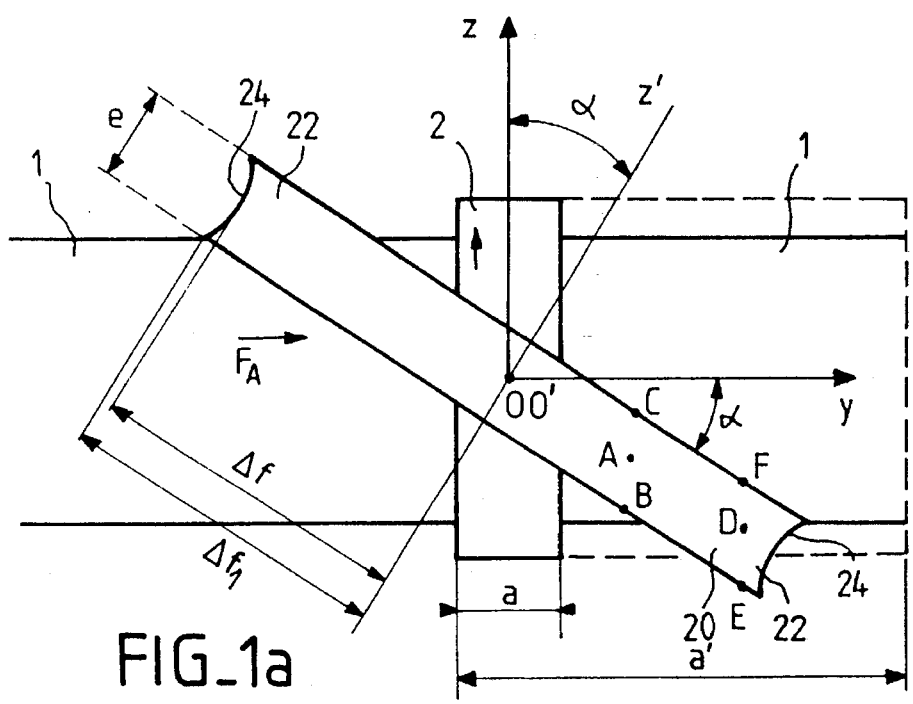
FIG_1a
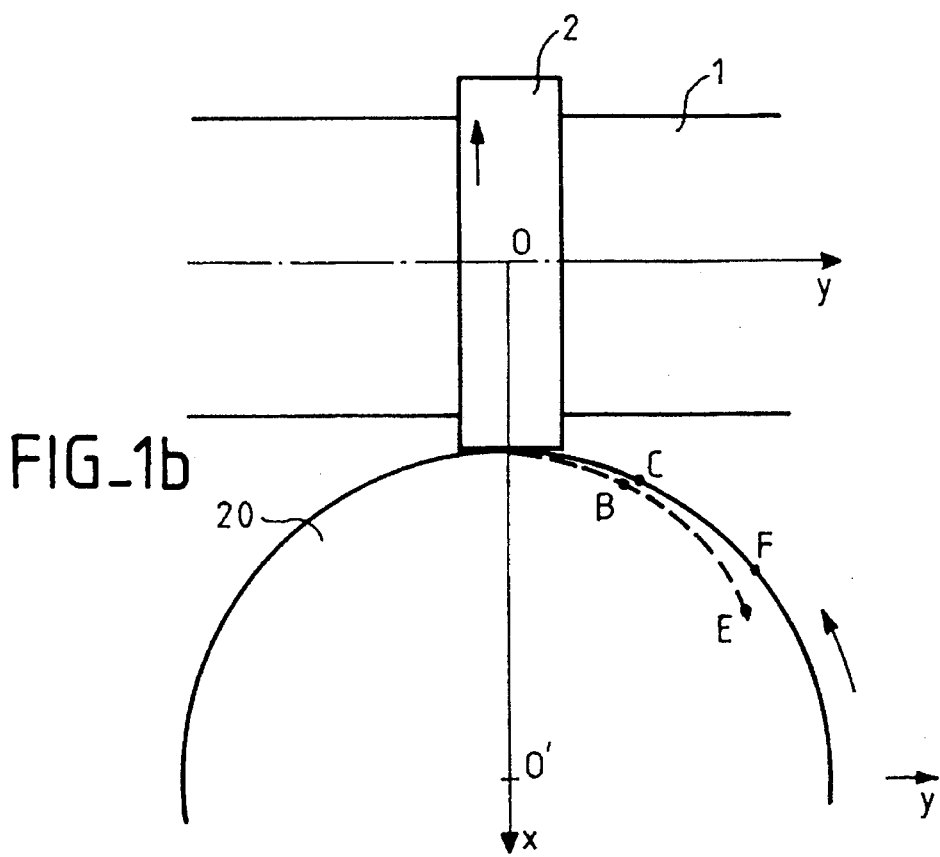
FIG_1b

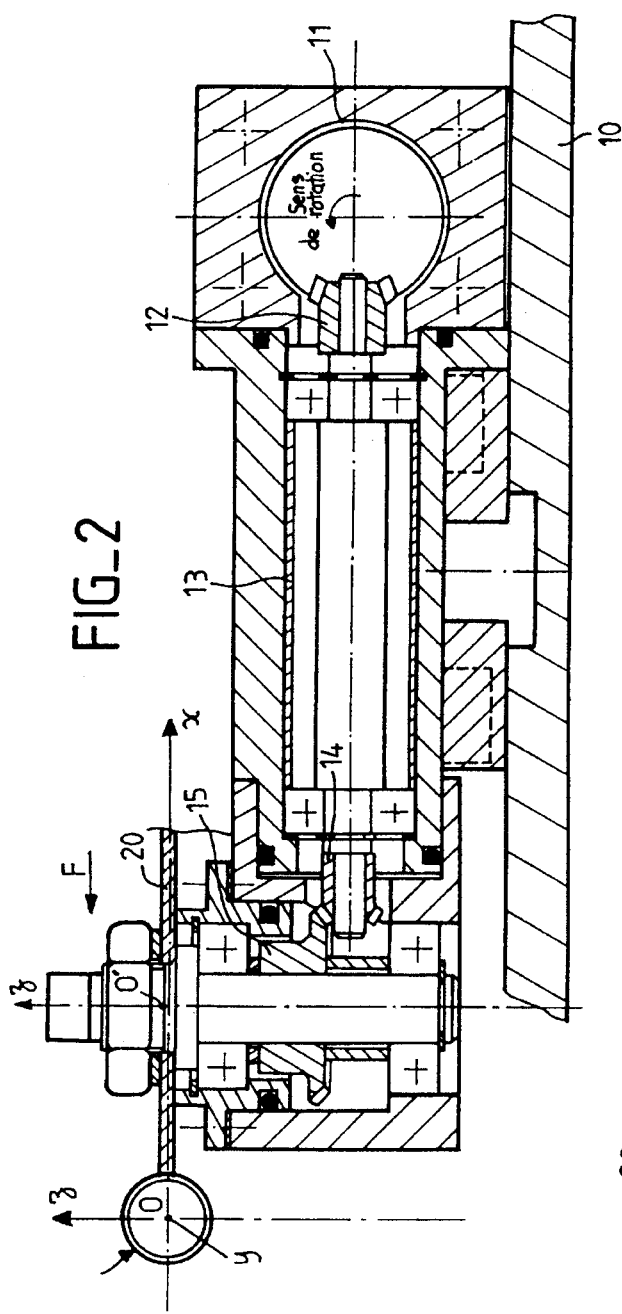
FIG_2
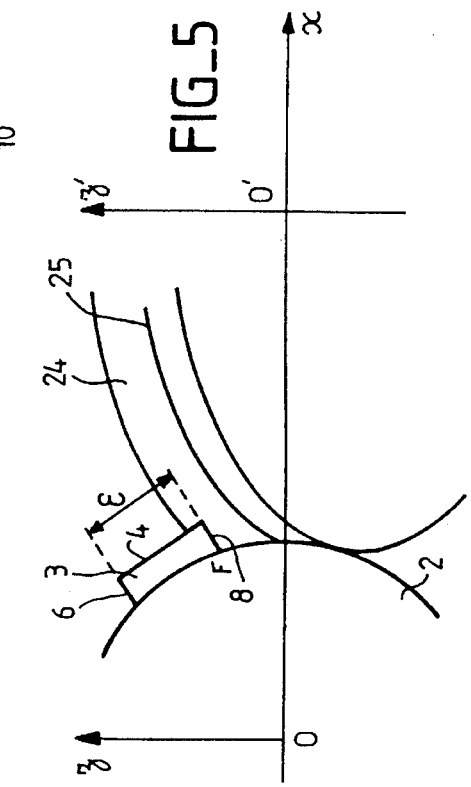
FIG_5
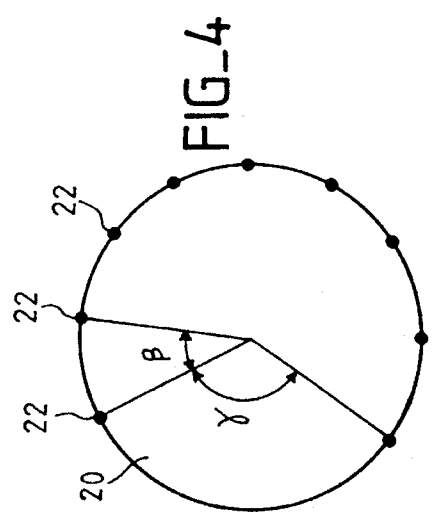
FIG_4

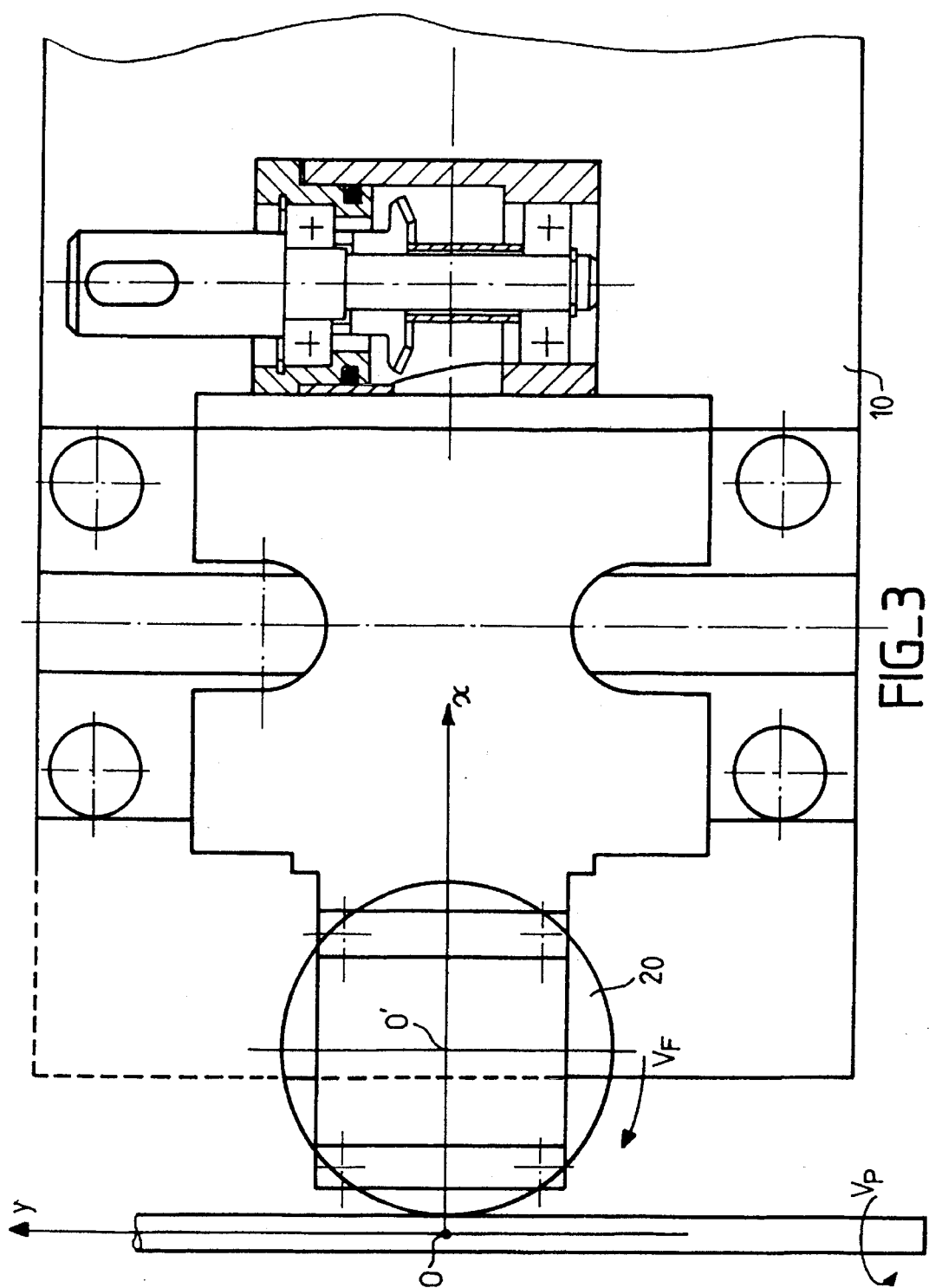
FIG_3

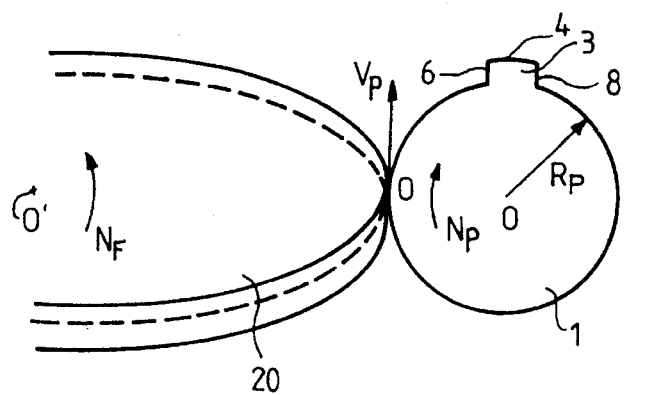
FIG_6
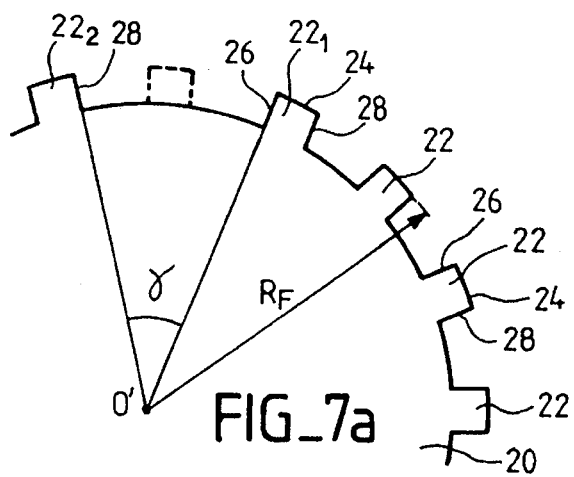
FIG_7a
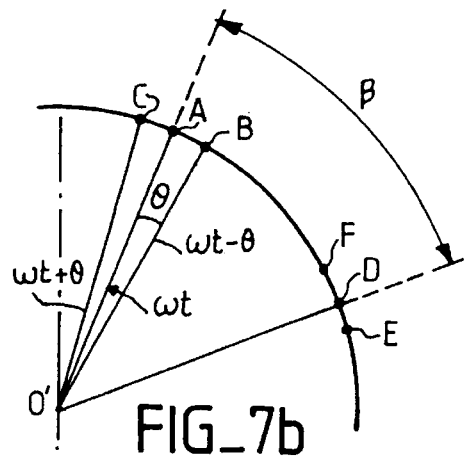
FIG_7b
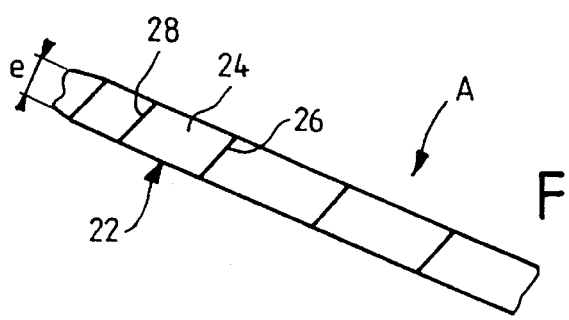
FIG_8
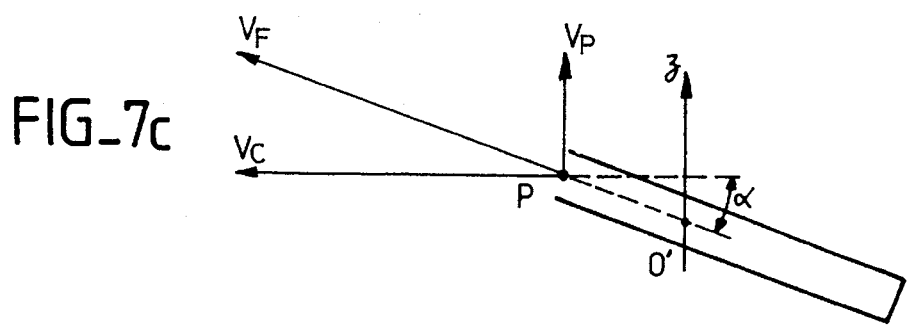
FIG_7c

METHOD OF MILLING AT LEAST A LOCALIZED REGION OF A WORKPIECE

BACKGROUND OF THE INVENTION

1. Field of the Invention

The present invention concerns a method of milling at least a localized region such as a key or lug or a groove on a workpiece.

2. Description of the Prior Art

Conventional methods of machining such workpieces comprise two successive operations:

1-Turning portions which are bodies of revolution, leaving unmachined the portions that are to have a straight axial profile such as lugs or keys.

2-Further machining of the workpiece to form the straight shapes. This further machining is done on a press, which has the major drawback of deformation of the workpiece, or on a nibbler, which has the drawback of long machining times, or on a milling machine, which has the drawbacks of a long machining time on a high-cost machine.

Techniques known collectively as "polygonal turning" are used to make parts with a regular polygonal cross-section (flats, for example). These techniques are described in patent applications FR-A-2 301 326 and FR-A-2 171 187, for example.

These techniques are based on an operation combining milling and turning using a milling machine having a rotation axis parallel to the axis of the workpiece, an angular rotation speed synchronized to that of the workpiece and the same rotation direction as the workpiece so that at the point of contact of the workpiece and the tool the respective peripheral speeds are in opposite directions. This latter technique is described in "Dispositif de filetage par fraise et de tournage polygonal TD" (April 1974-Hemmann TRAUB MACHINEFABRIK-West Germany). It is not suitable for making keys or lugs.

An object of the present invention is a method of milling for forming localized regions such as keys or lugs in a single operation, in less time and therefore at reduced cost.

SUMMARY OF THE INVENTION

The invention consists in a method of milling at least one localized region of a workpiece, comprising:

rotating the workpiece about a horizontal axis of a cylindrical region thereof, said cylindrical region having a radius $R_p$, bringing an external contour of radius $R_F$ of a tool into contact with said cylindrical region of said workpiece at a machining point, said tool rotating about a rotation axis intersecting a first transverse axis of said workpiece perpendicular to said longitudinal axis and intersecting the latter, said rotation axis being in a plane parallel to said longitudinal axis and to a second transverse axis of said workpiece perpendicular to said first transverse axis and to said longitudinal axis and intersecting them, the rotation axis being at an angle α to said second transverse axis.

The angular speeds of the workpiece and the tool are advantageously in integer ratio, i.e. they are equal to each other or multiples or sub-multiples of each other.

The workpiece and the tool advantageously have equal angular speeds. With $\sin\alpha = R_p/R_F$, the tangential speeds of the tool and the workpiece are the same.

The lateral edges of the teeth of the tool are advantageously inclined to the rotation axis of the tool, which enables cutting perpendicular to the lug to be formed by the tooth.

The tool can have one or more sectors with no teeth to enable machining of one or more lugs.

In a preferred embodiment of the invention the tool has teeth with an elliptical concave profile outside edge.

In a preferred embodiment of the invention the method includes a step of advancing the tool parallel to said longitudinal axis, enabling forming of one or more profiles elongate in said direction.

Other features and advantages of the invention will emerge more clearly from a reading of the following description given by way of non-limiting example with reference to the drawings.

BRIEF DESCRIPTION OF THE DRAWINGS

FIGS. 1a and 1b show a device for implementing the machining method of the invention, respectively from the side and from above.

FIGS. 2 and 3 show a machine tool for implementing the invention, respectively from the side and from above.

FIG. 4 is a diagrammatic plan view of one embodiment of a tool for implementing the method of the invention.

FIG. 5 is a diagram showing the machining of a lug by the method of the invention.

FIGS. 6, 7a, 7b and 7c show the method of the invention, respectively by means of a longitudinal view of the workpiece and of the tool, by top views of the tool (FIGS. 7a and 7b), and by a side view of the tool.

FIG. 8 shows a preferred embodiment of the teeth of a tool in accordance with the invention.

DETAILED DESCRIPTION OF THE PREFERRED EMBODIMENTS

Referring to the figures, a workpiece 1 to be machined has an annular ring 2 into which a lug 3 must be machined, the ring 2 having a radius $R_p$ (exclusive of the lug). The workpiece 1 to be machined is rotated about an axis Oy, a horizontal axis in this instance, at a rotation speed equal to $N_p$ rpm, corresponding to a tangential speed $V_p$.

A milling cutter 20 with an outside radius $R_F$ is rotated at a rotation speed equal to $N_F$ rpm about an axis O'z'. An axis Ox perpendicular to the axis Oy (and also horizontal in the example shown) intersects the axis O'z' at O'. An axis Oz passes through O and is perpendicular to the axes Ox and Oy, i.e. it is a vertical axis in the example shown. An axis O'z passes through O' and is parallel to the axis Oz.

The axis O'z is parallel to the axes Oy and Oz and is at an angle α to the axis O'z'.

The angle α is preferably such that the component of the tangential speed of the tool on the axis Oz (i.e. the vertical component in this instance) is equal to the tangential speed of the workpiece 1.

Accordingly, the tool 20 moves with a nibbling motion relative to the workpiece 1 at its point of contact with the latter.

At a machining point P (FIG. 7c):

$$V_p = V_F \sin\alpha$$

Given that:

$$V_p = 2\pi R_p N_p$$

$$V_F = 2\pi R_F N_F$$

then:

$$\sin \alpha = \frac{R_p N_p}{R_F N_F}$$

This defines a machining point P moving over the workpiece 1 along a path which is substantially a straight line segment.

To achieve regular machining $N_p/N_F$ or $N_F/N_p$ must be an integer ratio. Usually $N_p = N_F$.

To form a lug it is sufficient for the tool to have a cutaway sector (in which there are no teeth) so that no material is removed at the required location.

The cutaway on the tool 20 is on the bias at an angle such that the flanks 26 and 28 of the teeth $22_1$ and $22_2$ which form the flanks 6 and 8 of the lug 3 are as close as possible to the axis of the tool 20 and thus to the point at which tangential synchronization is achieved.

It is advantageous if the exterior profile 24 of the teeth 22 has an elliptical concave shape.

In practise a conventional tool with one or more teeth removed can be used to implement the method.

In FIG. 7b the points A, B and C represent one tooth 22 of the tool 20 and the points DEF the next tooth 22. In the following calculation it is assumed that the tool 20 and the workpiece 1 rotate at the same angular speed.

Outside the area(s) in which a lug is to be formed, the machining effected by the two successive teeth must overlap so that no material remains.

The angular offset β (in radians) between two teeth 22 must be less than a given value:

$$\beta < \pi - 2 \text{ Arc cos} \frac{e}{2 R_p \cos \alpha}$$

where e is the height of the teeth 22 of the tool 20 (see FIGS. 1a and 8).

The angle θ, which is half the angle subtended by a tooth 22 of the tool 20, has the following optimal value:

$$\theta = \text{Arc cos} \left( \frac{e}{2R_p \cos \alpha} \right) - \left( \frac{\pi}{2} \right)$$

This value provides the best approximation of cylindrical machining of the cylindrical contour 2 outside the lug 3.

An angular cutaway γ, i.e. an angular area with no teeth 22, is provided between the teeth $22_1$ and $22_2$ (see FIGS. 4 through 7a). The lateral edges 26 of the tooth $22_1$ and 28 of the tooth $22_2$ machine lateral edges 6 and 8 of the lug 3. The diameter of the outside edge 4 of the lug 3 remains equal to the diameter of the ring 2. The lug 3 has a width ε (FIG. 5).

The following equation applies:

$$\gamma = \text{Arc sin} \left( \frac{e}{2R_p \cos \alpha} \right) + 2 \text{ Arc sin} \left( \frac{\epsilon}{2R_p} \right) - \theta$$

The minimal number of tooth on the tool is then defined by the equation:

$$\gamma + (n-1)\beta = 2\pi$$

In accordance with the invention, machining is effected merely by radial inward movement (arrow F in FIG. 2). Keys or lugs 5 can be formed using a lathe with no spindle indexing.

As the workpiece 1 rotates, another machining operation can be carried out at the same time. Thus machining a lug does not increase the overall production time.

The machining cycle can include one or more steps of longitudinal advance along the axis Oy (arrow FA) to form long profiles. This length is equal to the length a' of a ring 2 shown in dashed outline in FIG. 1a.

The adjustment is a simple one. Starting from the position shown in FIG. 2 (α=0) all that is required is to adjust the angle α, the height of the tool along the O'z axis and the depth to which the tool is advanced along the O'x axis. Referring to FIG. 2, the tool 20 is driven by a mechanism 15 meshing with a horizontal axis toothed wheel 14 driven by a coupling shaft 13 and a toothed wheel 12 driven by a drive shaft 11.

The value of the angle α controls the shape of the lug or the profile. If the tangential speed of the tool on the axis Oz is equal to the tangential speed of the workpiece the lug or the profile is substantially plane.

The tool 20 is simple to make. In its simplest form it is a standard milling cutter with a cutaway subtending an angle γ formed by grinding.

The method of the invention can be implemented on any milling machine having a synchronous speed drive for milling screwthreads or for polygonal machining, on any fixed or mobile headstock lathe, with single-spindle or multi-spindle cams, or on numerically controlled production lathes employing mechanical or electronic synchronization.

The method of the invention can be used to manufacture any workpiece incorporating keys or lugs with small dimensions, in particular brass or aluminum workpieces.

The main applications are to electrical or fluid connectors and to valves.

The above description refers to the preferred situation in which $N_p = N_F$.

$N_p$ can be a multiple of $N_F$ ($N_p = kN_F$). In this case the tool 20 has a number of angular cutaways γ spaced by 360°/k for each lug 3 to be formed.

$N_F$ can be a multiple of $N_p$ ($N_F = jN_p$). In this case an angular cutaway γ of the tool 20 corresponds to j lugs 3 on the workpiece 1.

EXAMPLE

Formation of lugs on a tube 1 with an outside diameter of 12 mm, using a tool whose diameter is equal to three times that of the workpiece and comprising 64−1=63 teeth.

The method of the invention can also be applied to the production of grooves. In this case the tool has a small number of teeth (one tooth minimum), the tooth profile defining the width of the groove.

There is claimed:

1. Method of milling at least one localized region of a workpiece by a tool, comprising:

rotating the workpiece about a longitudinal axis of a cylindrical region thereof, said cylindrical region having a radius $R_p$, bringing an external contour of radius $R_F$ of said tool into contact with said cylindrical region of said workpiece at a machining point, said tool rotating about a rotation axis intersecting a first transverse axis of said workpiece perpendicular to said longitudinal axis and intersecting the latter, said rotation axis being in a plane parallel to said longitudinal axis and to a second transverse axis of said workpiece perpendicular to said first transverse axis and to said longitudinal axis and intersecting them, said rotation axis being at an angle α to said second transverse axis.

2. Method according to claim 1 wherein the tangential speed of said tool parallel to said second transverse axis is equal to the tangential speed of said workpiece.

3. Method according to claim 1 wherein the angular speeds of said workpiece and said tool are in integer ratio.

4. Method according to claim 3 wherein said workpiece and said tool have equal angular speeds.

5. Method according to claim 4 wherein $\sin \alpha = R_p/R_F$.

6. Method according to claim 1 wherein said tool has teeth having lateral edges inclined relative to the tool rotation axis.

7. Method according to claim 1 wherein said tool has at least one angular cutaway with no teeth to enable machining of a lug.

8. Method according to claim 7 wherein said tool has teeth having an elliptical concave profile outside edge.

9. Method according to claim 1 including a step of advancing said tool parallel to said longitudinal axis in order to form an elongate profile.

* * * * *